(12) United States Patent
Dudar et al.

(10) Patent No.: US 10,087,891 B2
(45) Date of Patent: Oct. 2, 2018

(54) SYSTEMS AND METHODS FOR ON-BOARD DATA PROCESSING

(71) Applicant: Ford Global Technologies, LLC, Dearborn, MI (US)

(72) Inventors: Aed M. Dudar, Canton, MI (US); Imad Hassan Makki, Dearborn Heights, MI (US); Robert Roy Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 15/246,356

(22) Filed: Aug. 24, 2016

(65) Prior Publication Data
US 2018/0058386 A1   Mar. 1, 2018

(51) Int. Cl.
| | | |
|---|---|---|
| *F02M 25/08* | (2006.01) | |
| *F02D 41/26* | (2006.01) | |
| *G07C 5/00* | (2006.01) | |
| *G07C 5/08* | (2006.01) | |
| *F02D 41/00* | (2006.01) | |
| *F02D 41/22* | (2006.01) | |
| *H04L 29/08* | (2006.01) | |
| *F02D 41/24* | (2006.01) | |

(52) U.S. Cl.
CPC ..... *F02M 25/0818* (2013.01); *F02D 41/0045* (2013.01); *F02D 41/26* (2013.01); *F02D 41/266* (2013.01); *G07C 5/008* (2013.01); *G07C 5/0808* (2013.01); *G07C 5/0816* (2013.01); *F02D 41/22* (2013.01); *F02D 41/2416* (2013.01); *F02D 2041/224* (2013.01); *F02D 2200/021* (2013.01); *F02D 2200/0602* (2013.01); *F02D 2200/0606* (2013.01); *F02D 2200/501* (2013.01); *F02D 2200/701* (2013.01); *H04L 67/12* (2013.01)

(58) Field of Classification Search
CPC ... F01D 41/0045; G06N 5/022; F01N 3/2066; G01M 15/08
See application file for complete search history.

(56) References Cited

U.S. PATENT DOCUMENTS

| | | | |
|---|---|---|---|
| 7,912,641 B2 | 3/2011 | Osentoski et al. | |
| 8,509,987 B2 | 8/2013 | Resner | |
| 2010/0250089 A1* | 9/2010 | Buslepp | G01M 15/08 701/102 |
| 2013/0246135 A1 | 9/2013 | Wang | |
| 2017/0022865 A1* | 1/2017 | Khaled | F01N 3/2066 |
| 2017/0024646 A1* | 1/2017 | Yang | G06N 5/022 |

* cited by examiner

*Primary Examiner* — Yuri Kan

(74) *Attorney, Agent, or Firm* — Julia Voutyras; McCoy Russell LLP

(57) ABSTRACT

Methods and systems are provided for processing of an on-board diagnostic (OBD) test dataset, and transferring parameters of a curve fit to the processed data to an off-board location. In one example, a method may include performing an evaporative emissions system diagnostic test, fitting a curve to at least a part of the data, transferring parameters of the curve fit, along with the start, and end data points to an off-board location for further processing. The on-board controller may adjust engine operating conditions based on signal received from the off-board location after off-board data reconstruction, and analysis.

20 Claims, 5 Drawing Sheets

SYSTEMS AND METHODS FOR ON-BOARD DATA PROCESSING

FIELD

The present description relates generally to methods and systems for processing of diagnostics data on-board a vehicle.

BACKGROUND/SUMMARY

Vehicles may be fitted with evaporative emission control systems (EVAP) to reduce the release of fuel vapors to the atmosphere. For example, a fuel vapor canister packed with an adsorbent may adsorb and store refueling, running loss, and diurnal fuel vapors. At a later time, when the engine is in operation, the evaporative emission control system allows the vapors to be purged into the engine intake manifold for use as fuel. In an effort to meet stringent federal emissions regulations, emission control systems may need to be intermittently diagnosed for the presence of undesired evaporative emissions (leaks) that could release fuel vapors to the atmosphere. The data generated during each diagnostics test may be used to understand the results of the test, and the overall health of the EVAP system.

Accordingly, various approaches have been developed for transferring on-board diagnostics (OBD) data to an off-board location. One example approach, shown by Wang et. al. in US 20130246135 involves transferring diagnostic data from on-board diagnostics tests to a remote server. The vehicle's OBD unit may transfer the OBD data to the vehicle's electronic control units which may then transfer the data to a remote server either directly or via a smart device having a wireless communication module. The data may be analyzed at the remote location, and a signal may be sent to the vehicle operator to notify if there is a requirement for servicing one or more vehicle components.

However, the inventors herein have recognized potential issues with such a system. As one example, on-board diagnostics (OBD) of EVAP and other vehicle systems may generate a large quantity of data which may be difficult to efficiently transfer via available wireless communication. Also, a remote location with a sufficient data storage capacity (e.g., memory) may be required for storing all the available OBD data. As such, a part of the OBD data such as the start and the end points of a test may be transferred and stored at a remote location. However, the start and end points of the OBD data, such as EVAP system leak test data, may be influenced by vehicle operating conditions such as a hill climb or rough roads which may cause fuel sloshing. For example, a fuel tank pressure profile analyzed for EVAP system diagnostics may incorrectly indicate a leak during a driving condition that caused fuel sloshing. The erroneous diagnostic result may affect vehicle operation, and in the absence of complete OBD data, it may be difficult to comprehend the cause of the EVAP system leak indication. Also, due to access to only a limited portion of the OBD data, the data may not be efficiently analyzed at an off-board location.

In one example, the issues described above may be addressed by a method for a vehicle including an engine, comprising: fitting a function to one or more segments of a diagnostic dataset for an engine component on-board the vehicle; and transferring parameters of the function, and not the one or more segments of the dataset, to an off-board location. In this way, by efficiently fitting a curve to the OBD data, a smaller amount of data comprising the curve fitting parameters, and vehicle operating conditions may be transferred to an off-board location for analysis, storage, and future use.

As an example, during a diagnostic test of the EVAP system, a vacuum may be applied to a sealed EVAP system and the bleed-up of the pressure may be monitored. If the rate of pressure bleed-up is higher than a threshold rate, or the EVAP system pressure, after a pre-defined duration of the test, is higher than a threshold pressure, it may be inferred that there is presence of a leak in the EVAP system. If such a leak is detected, a part of the OBD data collected during pressure bleed-up may be fitted with a curve. The nature of the expected curve for this data may be retrieved from the controller memory. If it is possible to fit the data with the expected curve and get a curve fit that has a higher than threshold coefficient of determination ($R^2$), it may be inferred that the diagnostic test results are reliable. However, if the expected curve does not provide a higher than threshold fit, one or more other curves are iteratively tried until a curve fit with a higher than threshold $R^2$ value is achieved. For example, polynomials of different order, exponential curves, Gaussian curves, etc., maybe used for the curve fit. The entire data may be fitted with one curve, or the data may be divided into sections, and each section may be fitted with a distinct curve. Once a reliable curve fit has been achieved, the coefficients of the curve(s) and the $R^2$ value(s) may be transferred to an off-board location. Also, the start and end data points, and vehicle operating conditions during the test, such as temperature, altitude, vehicle speed, vehicle location (retrieved from a global positioning satellite, for example), fuel level, engine load, etc., may be transferred to the off-board location. At the off-board location, the entire dataset may be reconstructed using the curve fitting coefficients, and further analyzed. The controller may receive instructions from the off-board location for updating EVAP system leak test results and engine operations based on the data analysis. Also, during vehicle servicing, a technician at a service station may retrieve the entire diagnostic dataset from the information available at the off-board location and service the vehicle accordingly.

In this way, by fitting a diagnostics test data with a best fitting curve and transferring the coefficients of the curve to an off-board location, it may be possible to access and analyze the entire diagnostics dataset at the off-board location, and at a service station. In case of erroneous test results caused by external conditions (such as fuel sloshing during an EVAP system leak test), by utilizing instructions received from an off-board location, the on-board results may be updated, and engine operation may be optimized. The technical effect of fitting a curve to data collected on-board the vehicle, and transferring only the coefficients of the fit, along with start and end points of the data to an off-board location, is that faster transfer of data to the off-board location may be accomplished using a smaller band-width. Also, due to the transfer of a smaller, but more relevant, portion of the data, a smaller amount of storage space (memory) may be occupied at the off-board location. Overall, by fitting a curve, transferring a smaller amount of data, and curve fitting engine operating parameters, a larger portion of the OBD dataset (e.g., the entire portion) may be reproduced, and analyzed at the off-board location, thereby improving off-board processing of data. By increasing the accuracy and reliability of data processing without increasing storage or processor requirements, vehicle performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
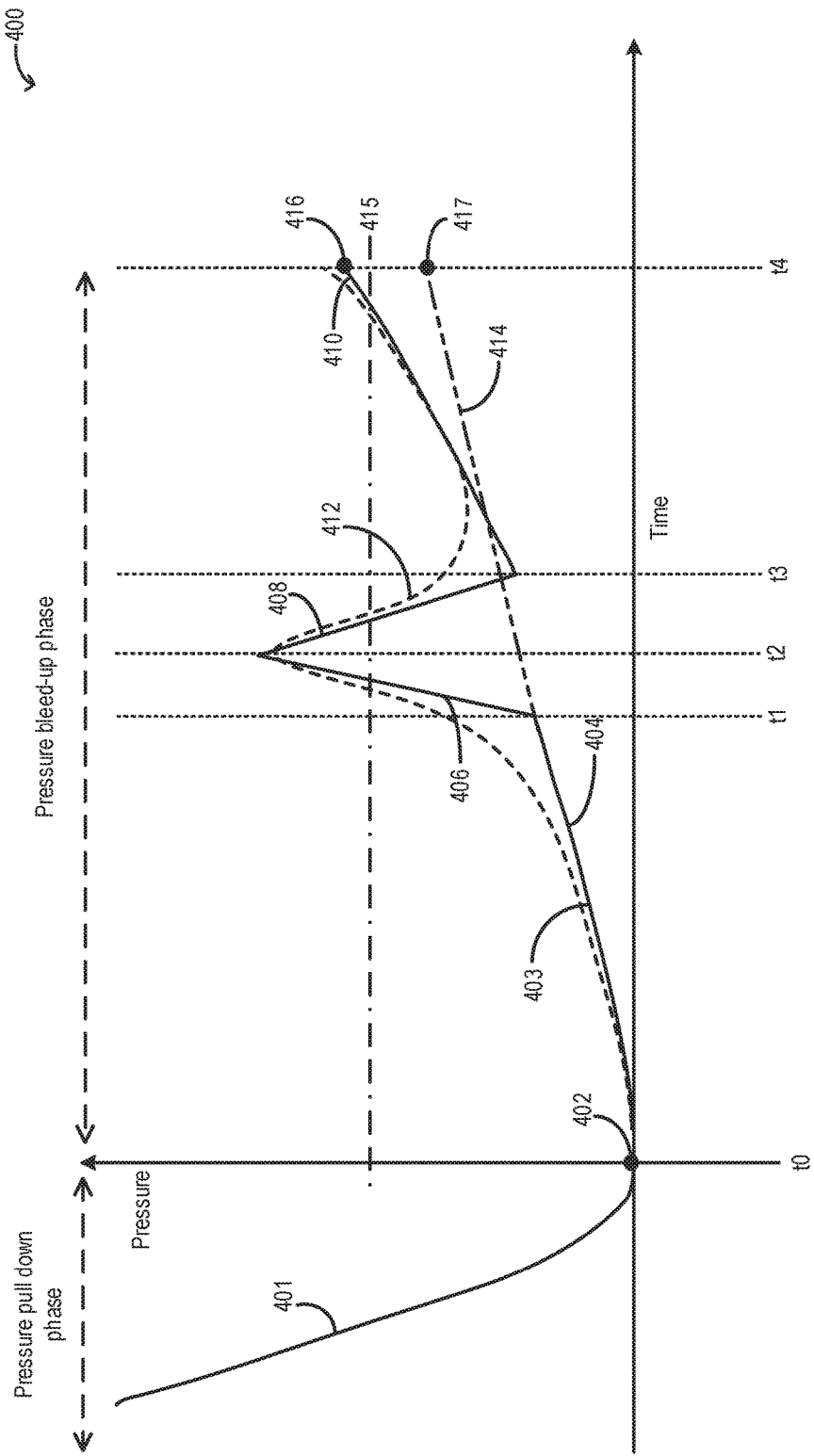
FIG. 4 shows an example curve fitting for an evaporative emissions control system diagnostic data.
Figure 5:
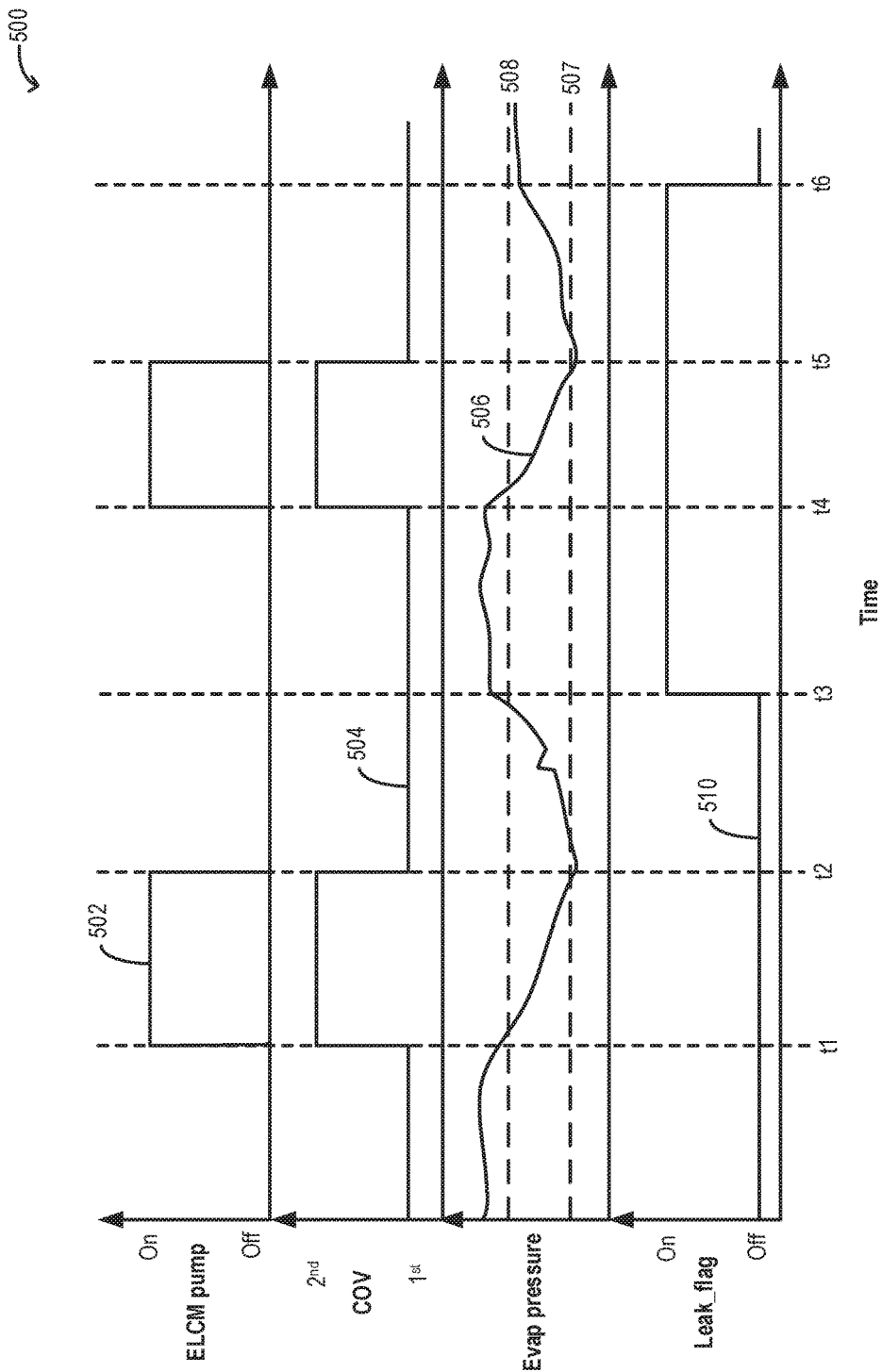
FIG. 5 shows an example evaporative emissions control system diagnostic, according to the present disclosure.

The following description relates to systems and methods for carrying out on-board diagnostic tests (OBD), processing the OBD data, transferring components of the processed data to an off-board location, and adjusting engine operating parameters based on signal received from the off-board location. In the present disclosure, the diagnostics are described with reference to an evaporative emissions control system, such as the system shown in FIG. 1. However, in alternate examples, other engine systems may be diagnosed. An engine controller may be configured to perform a control routine, such as the example routines of FIGS. 2 and 3 for carrying out evaporative emissions control system diagnostic tests, and processing the test data to fit a curve to the data. An example of a curve fit to an evaporative emissions control system diagnostic test data is shown in FIG. 4 and an example of carrying out an evaporative emissions control system diagnostic using data processed on-board and off-board the vehicle is shown in FIG. 5.

Figure 1:
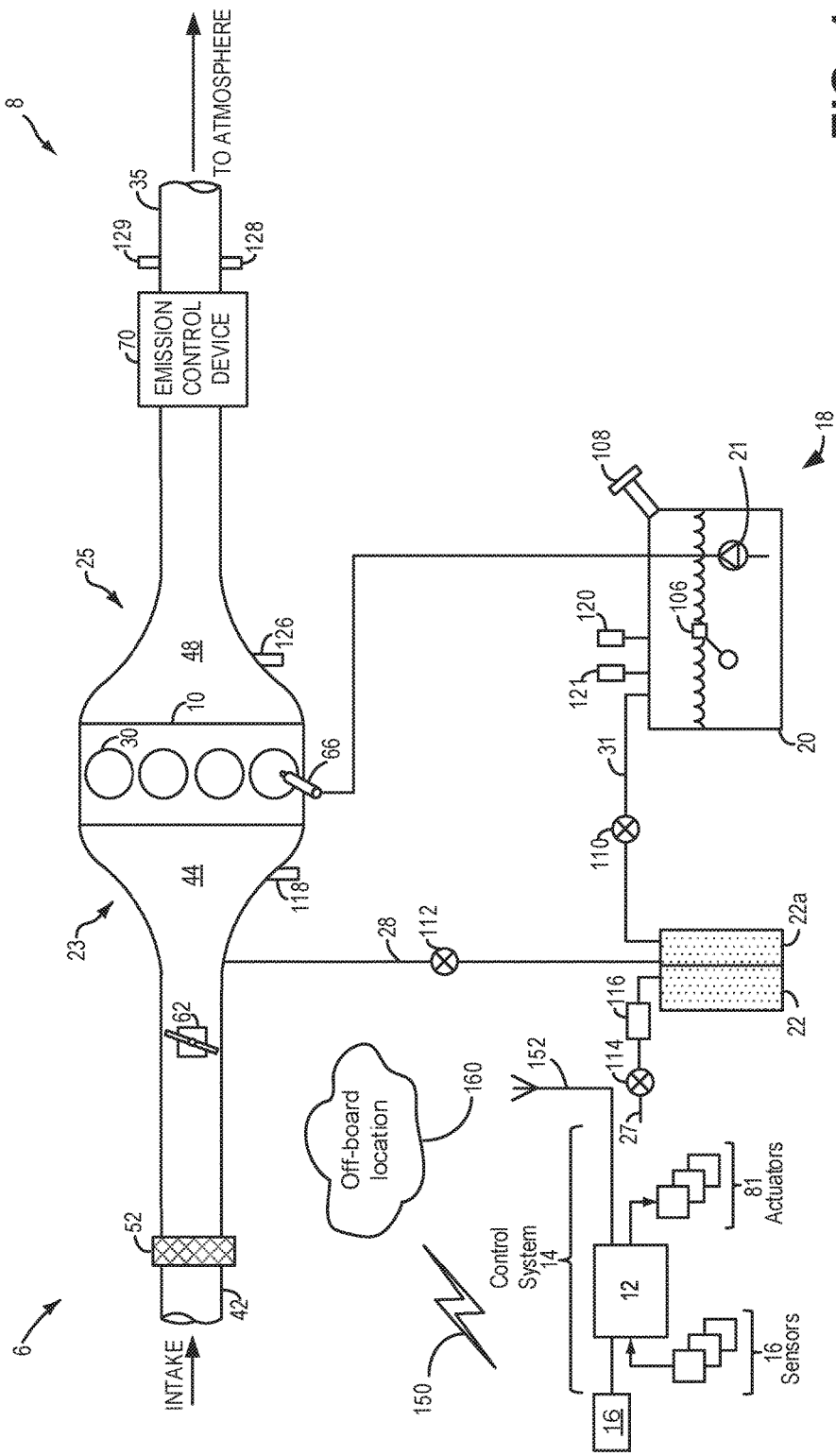
FIG. 1 shows a schematic diagram of a vehicle engine system including an evaporative emissions control system and a vehicle wireless communication system.

FIG. 1 shows a schematic depiction of a vehicle system 6 that can derive propulsion power from engine system 8. Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 may be a boosted engine system, the engine system may further include a boosting device, such as a turbocharger (not shown).

Engine system 8 may be coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling port 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be an open that is closed upon actuation of the canister vent solenoid.

A fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

One or more pressure sensors 120 may be coupled to fuel system 18 for providing an estimate of a fuel system pressure. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before allowing enabling fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 and canister vent valve 114 while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

An evaporative leak check module (ELCM) 116 may be coupled to the vent 27 between the canister 22, and the vent valve 114. ELCM 116 may include a vacuum pump configured to apply a negative pressure to the fuel system when administering a leak test. ELCM 116 may further include a crossover valve (COV), a reference orifice and a pressure sensor. Following the application of vacuum to the fuel system, a change in pressure at the reference orifice (e.g., an absolute change or a rate of change) may be monitored and compared to a threshold. Based on the comparison, undesired evaporative emissions from the fuel system may be identified. The ELCM vacuum pump may be a reversible vacuum pump, and thus configured to apply a positive pressure to the fuel system when a bridging circuit is reversed placing the pump in a second conformation.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, fuel system pressure sensor 120, exhaust pressure sensor 129, and cabin occupancy sensor. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, fuel pump 21, ELCM pump, and throttle 62.

A wireless communication device 152 may be coupled to the control system 14 for communicatively coupling the vehicle system 6 with an off-board location 160. In one example, the off-board location 160 may include a network cloud, a remote server, or an off-board controller. Also, a navigation system 154 such as a global positioning system (GPS) may be coupled to the control system 14 to determine location of the vehicle 6 during an ongoing diagnostic test. The navigation system may also be connected to off-board location 160 via wireless communication 150.

Control system 14 may further receive information regarding the location of the vehicle from the GPS system. Information received from the GPS may include vehicle speed, vehicle altitude, vehicle position, etc. This information may be used to infer engine operating parameters, such as local barometric pressure. Control system 14 may further be configured to receive information via the internet or other communication networks.

The control system 14 may include a controller 12. The controller 12 receives signals from the various sensors of FIG. 1 and employs the various actuators of FIG. 1 to adjust engine operation based on the received signals and instructions stored on a memory of the controller. For example, the controller 12 may also be configured to intermittently perform leak detection routines on fuel system 18 (e.g., fuel vapor recovery system) to confirm that the fuel system is not degraded. As such, various diagnostic leak detection tests may be performed while the engine is off (engine-off leak test) or while the engine is running (engine-on leak test). Leak tests performed while the engine is running may include applying a negative pressure on the fuel system for a duration (e.g., until a target fuel system vacuum is reached) and then sealing the fuel system. As an example, the controller 12 may actuate an actuator coupled to the ELCM pump to operate the pump to generate a vacuum, and then the controller 12 may adjust the COV to apply the vacuum to the fuel system. The controller may monitor a change (bleed-up) in fuel tank pressure (e.g., a rate of change in the vacuum level, or a final pressure value) via pressure sensor 120. Leak tests performed while the engine is not running may include sealing the fuel system following engine shut-off and monitoring a change in fuel tank pressure. This type of leak test is referred to herein as an engine-off natural vacuum test (EONV). In sealing the fuel system following engine shut-off, a vacuum will develop in the fuel tank as the tank cools and fuel vapors are condensed to liquid fuel. The amount of vacuum and/or the rate of vacuum development may be compared to expected values that would occur for a system with no leaks, or a system with leaks of a predetermined size.

Such leak tests may produce erroneous results during driving conditions where fuel sloshing occurs (such as driving on a hills, driving over a pothole, etc.). Fuel sloshing may generate additional fuel vapors in the fuel tank that may in turn cause fluctuations in fuel tank pressure, thereby influencing the pressure bleed-up in the fuel system as monitored for EVAP system leak detection. In addition to affecting the end-point of the bleed-up pressure profile, fuel sloshing can also generate multiple intermediate pressure peaks between the start point and end-point of the bleed-up phase. Adjustments to engine operation made due to erroneous diagnostic results may adversely affect engine performance. If a leak is detected in the fuel system, engine operation adjustments such as increasing a frequency of purging a fuel system canister to the engine may be carried out. To reduce issues associated with erroneous data analysis, a part or the entire of the OBD data collected during the diagnostic test may be fitted with a best fit curve, as elaborated with reference to FIG. 2. If it is possible to fit the data with an expected curve profile (as retrieved from controller memory) and get a curve fit that has a higher than threshold coefficient of determination ($R^2$), it may be inferred that the diagnostic test results are reliable. However, if the expected curve does not provide a higher than threshold fit, one or more other curves may be iteratively tried until a curve fit with a higher than threshold $R^2$ value is achieved. The entire data may be fitted with one curve, or the data may be divided into sections, and each section may be fitted with a distinct curve. Once a reliable curve fit has been achieved, the coefficients of the curve(s) and the $R^2$ value(s) may be transferred to an off-board location. Also, data corresponding to a start-point and an end-point of the dataset to the off-board location and vehicle operating conditions during the test, such as temperature, altitude, vehicle speed, vehicle location, fuel level, engine load, etc., may be transferred to the off-board location. At the off-board location, the entire dataset may be reconstructed using the curve fitting co-efficients, and further analyzed. The controller may receive instructions from the off-board location and accordingly update the EVAP system leak test results and engine operations based on the data analysis. Also, a technician at a service station may access the curve fitting coefficients, and reconstruct the entire diagnostic dataset which may facilitate in better vehicle service and repair. This approach of curve fitting, transferring to off-board location, and further use of on-board diagnostic data may be carried out for a plurality of vehicle systems such as emissions control system, turbocharger system, exhaust gas recirculation system, etc.

In this way, the components of FIG. 1 provides for a fuel system for a vehicle, comprising: a fuel tank, an evaporative emission control system (EVAP) including a fuel vapor canister coupled to the fuel tank via an isolation valve, a canister purge valve (CPV) positioned in a purge line between the fuel vapor canister and an engine intake manifold, a canister vent valve (CVV) positioned in a vent line between the fuel vapor canister and atmosphere, and a pressure sensor coupled to the fuel tank, a wireless communication device communicatively coupling the vehicle to an off-board controller, and an on-board controller, located on-board the vehicle. The controller may be configured with computer readable instructions stored on non-transitory memory for: performing an EVAP system diagnostic test by applying vacuum to the EVAP system, isolating the EVAP system from the engine and atmosphere by closing each of the vent valve and the purge valve, and monitoring an actual pressure bleed-up profile via the pressure sensor; in response to a higher than threshold rate of pressure bleed-up, indicating degradation of the EVAP system; adjusting a frequency of opening the CPV during engine operation based on the indication; fitting the actual pressure bleed-up profile using a curve profile having a higher than threshold coefficient of determination (R.sup.2), the curve profile selected from a set of curve profiles based on an expected pressure bleed-up profile; and uploading each of one or more coefficients of the curve profile, the R.sup.2, a start-point and an endpoint of the actual pressure bleed-up profile to the off-board controller.

Figure 2:
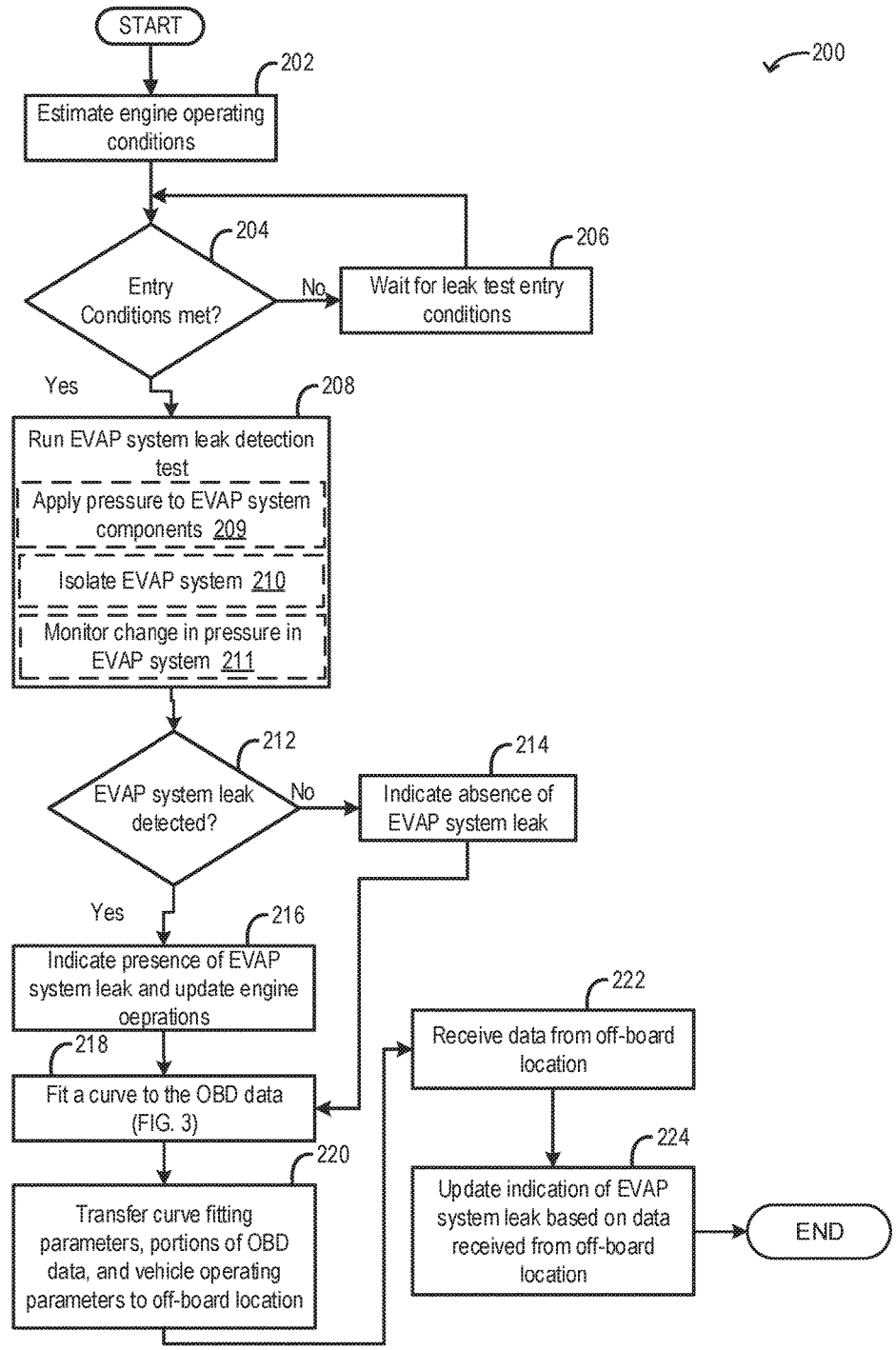
FIG. 2 shows a flow chart illustrating a method that may be implemented for conducting an evaporative emissions control system diagnostic routine and processing of the diagnostics data.

FIG. 2 illustrates an example method 200 for conducting an evaporative emissions system (EVAP) diagnostic routine and processing of the diagnostics data. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation according to the methods described below. It will be appreciated that while the routine of FIG. 2 describes the on-board processing of data with reference to OBD data collected from diagnosis of an evaporative emissions system, this is not meant to be limiting, and in other examples, diagnostics data from other engine systems may be similarly processed.

At 202, engine and vehicle operating conditions may be estimated by the controller based on inputs from a plurality of sensors. The estimated engine operating conditions may include, for example, driver demand, engine load, engine temperature, engine speed, air fuel ratio, ambient temperature, humidity, barometric pressure, etc. Vehicle conditions may include vehicle occupancy, vehicle speed, etc. Fuel system conditions, such as fuel level, fuel type, fuel octane content, fuel temperature, etc., and various evaporative emissions system conditions, such as fuel vapor canister load, fuel tank pressure, etc., may also be determined.

At 204, the routine includes determining if entry conditions for carrying out a diagnostic test of the evaporative emissions system are met. Entry conditions for an evaporative emissions diagnostic test may be met if a threshold time or distance of vehicle operation has elapsed since a last iteration of the diagnostic routine. For example, if the time elapsed since the last iteration of the diagnostic test is lower than a threshold time, a new diagnostic test may not be desired. In still further examples, entry conditions for the diagnostic test may be considered not met if any other diagnostic test which may affect the EVAP system diagnostic test is in progress. Further, entry conditions for an evaporative emissions diagnostic test may be considered met if the vehicle is not occupied, as inferred based on sensor output from a cabin occupancy sensor coupled to a vehicle passenger cabin, and/or onboard cameras. The controller may confirm that the vehicle is not occupied before initiating the diagnostic since movement of passengers inside the cabin and/or sudden opening of a vehicle door may corrupt diagnostic routine results.

If it is determined that the entry conditions are not currently met for carrying out the EVAP system diagnostic test, at 206, the controller may wait for optimal conditions before initiating an EVAP system diagnostic test. If it is determined that the entry conditions are met for carrying out the EVAP system diagnostic tests, at 208, an EVAP system leak detection test may be carried out. At 209, an evaporative leak check module (ELCM) pump may be operated to generate a vacuum (pressure bleed-down) in the EVAP system. During operation of the pump, the cross over valve (COV) of the ELCM unit may be actuated to a first position to allow air to be drawn out from the EVAP system to the atmosphere. The canister vent valve (CVV) may be actuated to an open position to fluidically couple the EVAP system to the atmosphere via the ELCM pump. Also, the canister purge valve (CPV) may be maintained at a closed position to maintain the fuel system separated from the engine intake manifold. A fuel system pressure sensor (such as pressure sensor 120 in FIG. 1) may be used to estimate the pressure bleed-down in the EVAP system.

At 210, when the vacuum in the EVAP system has reached a target vacuum level, the controller may isolate the EVAP system from the ELCM system, and the atmosphere by actuating the COV to the second position, and the CVV to a closed position. Once the EVAP system has been isolated, a negative pressure EVAP system leak test may be carried out. During the test, at 211, a change (bleed-up) in pressure in the EVAP system may be monitored via the fuel system pressure sensor. The rate of pressure bleed-up, and the final pressure at the end of a pre-determined test duration may be monitored.

At 212, the routine includes determining if a leak has been detected in the EVAP system. In one example, a leak may be inferred based on a higher than threshold pressure bleed-up rate during the negative pressure EVAP system leak test. In another example, a leak may be inferred if the final fuel system pressure at the end of the pre-determined test duration is higher than an upper threshold pressure. In yet another example, a leak may be inferred if during the vacuum generation (pressure bleed-down), the target vacuum level is not reached (e.g., EVAP system pressure does not reach a lower threshold pressure). A leak in the EVAP system may also be inferred based on other diagnostic tests such as negative pressure test using engine off natural vacuum (EONV).

If it is determined that there is no leak detected in the EVAP system, at 214, the absence of any leaks in the EVAP system may be indicated, and current engine operations may be maintained. If it is inferred that there is a leak in the EVAP system, at 216, a diagnostic code may be set indicating the presence of a leak, and degradation of an engine component. An initial state of the engine component (such as a component of the EVAP system) may be inferred based on the diagnostic data generated on-board the vehicle. In response to the detection of a leak in the EVAP system, engine operation may be adjusted. In one example, the canister purge schedule may be updated by scheduling canister purge operations more frequently, independent of the canister load, such that fuel vapor in the fuel system and/or evaporative emissions system may be effectively routed to the engine for combustion. In another example, purging operations may be suspended until it is indicated that the source of undesired evaporative emissions has been mitigated. Also, in response to the indication of a leak in the EVAP system, an isolation valve (fuel tank isolation valve) coupling the canister of the evaporative emissions system to a fuel tank may be closed.

At 218, a curve may be fit to at least a part of the diagnostic data. The actual pressure bleed-up profile may be fitted with one or more curves such as a polynomial curve, an exponential curve, and a Gaussian curve. One function may be used to fit the entire dataset or sections of the dataset corresponding to the actual pressure bleed-up profile may be fitted with distinct functions. The curve fitting may be iteratively continued until a coefficient of the curve fit such as the coefficient of determination ($R^2$) is higher than a threshold. As an example, an expected curve profile may be first used for curve fitting and in response to the curve fit coefficient for the first set of curves being lower than the threshold, a second set of curves may be selected based on the expected profile of the diagnostic data. A detailed description of the curve fitting process is discussed in FIG. 3. Also, at 214, if it is detected that there is no leak in the EVAP system, the routine may proceed to step 218, and a curve may be fit to the diagnostic data.

Once a reliable curve fit of the EVAP system diagnostic data has been accomplished, at 220, the curve fitting parameters may be transferred to an off-board location such as one of a remote server, an off-board controller, and a network cloud commutatively coupled to the vehicle via wireless communication. In one example, parameters of a polynomial curve that are transferred include one or more coefficients of a polynomial of the polynomial curve, and a coefficient of determination ($R^2$) of the polynomial curve. Also, a form of the function in addition to the parameters of the function may be transferred to the off-board location. Further, a start-point and end-point of the diagnostic dataset, and vehicle operating conditions at a time of performing the diagnostic routine including engine temperature, engine load, vehicle speed, ambient temperature, altitude, road incline, and vehicle position, may also be transferred to off-board the vehicle. Also, during conditions when no leak has been detected in the EVAP system, curve fitting parameters may be transferred to the off-board location for further analysis, and future use.

At 222, the controller may receive data from the off-board location via wireless-communication. The received data may include an updated diagnostic state of the vehicle component. The updated diagnostic state may be based on a reconstructed dataset that is reconstructed off-board the vehicle using the start point, end point, curve fit coefficient(s), and vehicle operating conditions previously transferred to the off-board location. Updating the diagnostic state may include updating that a previous indication of fuel system degradation (generated on-board the vehicle) is incorrect and confirming that the fuel system is not degraded. Also, instructions may be received from the off-board location to adjust one or more engine operating parameters in order to reduce the possibility of a future leak in the EVAP system. The adjustments for reducing the possibility of future leaks in the EVAP system may be based on the reconstructed OBD dataset from tests where there is no leak detected in the EVAP system.

At 224, on-board the vehicle, the indication of EVAP system leak, and one or more operating parameters of the vehicle may be adjusted based on the updated diagnostic state. In one example, based on the off-board data analysis it may be inferred that the leak was erroneously indicated due to driving conditions (such as driving on hills, driving over a pothole, etc.) that may have resulted in fuel sloshing. An indication of fuel sloshing in a fuel tank may be based on the dataset of the diagnostic routine, and further based on the updated diagnostic state received from off-board the vehicle. Fuel sloshing may generate additional fuel vapors in the fuel tank that may in turn cause fluctuations in fuel tank pressure, thereby influencing the pressure bleed-up in the fuel system as monitored for EVAP system leak detection. Based on the updated diagnostic state (input received from the off-board location), the initial indication of degradation may be updated, and further the frequency of canister purge by opening the CPV may be adjusted based on the received input. In another example, a form of curve fitting function may be received from the off-board location, and it may be suggested that the diagnostic routine be repeated. A new (second) diagnostics dataset may then be generated by repeating the diagnostic routine for the vehicle component (such as the EVAP system). A curve may be fitted with the received form of curve fitting function to at least a segment of the second dataset, the updated curve fit coefficient may be transferred to the location off-board the vehicle, and an updated diagnostic state of the vehicle component may be learned based on the second dataset.

The off-board data may also be retrieved during vehicle servicing and the entire OBD data set may be reconstructed and used for vehicle diagnostics, and service. Due to the transfer of a smaller (more relevant) portion of the data, a smaller amount of storage space (memory) may be occupied at the off-board location for storing the transferred data.

In this way, an on-board diagnostic routine may be carried out on an engine component, the data may be fitted with one or more functions, parameters of the function, and start and end points of the data may be transferred to an off-board location, the OBD data may be reconstructed, and analyzed at the off-board location and OBD test results may be updated based on a signal received from the off-board location.

Figure 3:
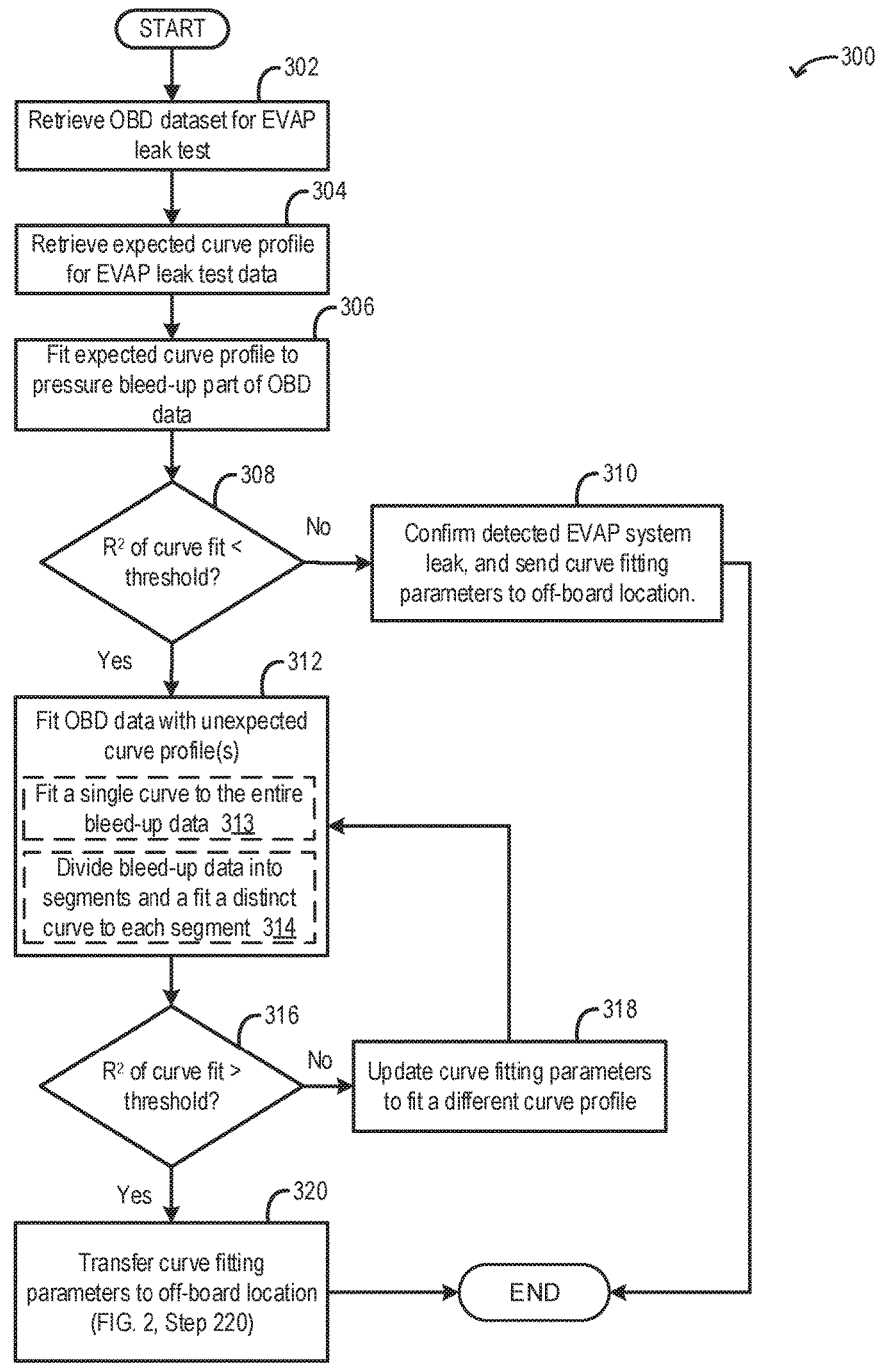
FIG. 3 shows a flow chart illustrating a method that may be implemented for curve fitting of the evaporative emissions control system diagnostic data.

FIG. 3 illustrates an example method 300 for effectively fitting a curve to on-board diagnostic (OBD) data pertaining to an evaporative emissions control (EVAP) system. The expected curve profile may correspond to a curve fitting profile for OBD data collected during a test period without any perturbing influence caused by external factors.

At 302, the routine includes retrieving all or part of OBD data from the controller memory once an EVAP system diagnostic test has been concluded, and presence of a leak has been inferred from the data. In one example, the pressure bleed-up phase of the negative pressure EVAP system diagnostic test may be used for the processing. During conditions when a leak has not been detected from the OBD data, the data may not be further processed, and therefore may not be retrieved from the controller's memory.

At 304, an expected curve profile and an expected set of parameters for an EVAP leak test bleed-up data may be retrieved from the controller memory. In one example, the expected curve profile may be a polynomial function of a certain order. In another example, the expected curve profile may be an exponential function. The expected curve profile may be based on an expected pressure profile of the EVAP leak test, which in turn is based on engine operating conditions at the time of the EVAP leak test. At 306, the expected curve profile with expected set of parameters may be used to fit a first set of curves to the bleed-up phase of the EVAP system diagnostics data. A coefficient of determination ($R^2$) value of the curve fit may be computed from the fit(s).

At 308, the routine includes determining if the $R^2$ value of a current curve fit is higher than a threshold value. The $R^2$ value signifies the quality of the fit, and a higher than threshold $R^2$ value confirms that a reliable fit has been achieved for the data. Alternatively, in order to understand the quality of fit, a standard optimization method of minimizing the sum of a squared error may be used. The routine may include determining if the sum of the squared error is lower than a threshold. The sum of the squared error is represents by:

$$\text{Min}(E) = \text{Sum}[f(x,y) - g(x,y)]^2 \qquad (1).$$

Where, Min (E) is the sum of the squared error that represents the quality of fit, and a lower than threshold Min (E) value confirms that a reliable fit has been achieved for the data. In equation (1), f(x,y) represents time based data samples and g(x,y) represents the analytical representation of the fitted curve.

If it is confirmed that the $R^2$ value is higher than the threshold or the sum of the squared error is lower than a threshold, it may be inferred that the EVAP system diagnostics results is accurate, and has not been influenced by external factors such as fuel sloshing during unusual road conditions.

Therefore, at 310, the detected EVAP system leak may be confirmed, and in response to the curve fit coefficient for the first set of curves being higher than a threshold, the curve fit parameters, and the coefficient for the first set of curves may be transferred to an off-board location. Also, a start-point and end-point of the diagnostic dataset, and vehicle operating conditions at a time of performing the diagnostic routine including engine temperature, engine load, vehicle speed, ambient temperature, altitude, and vehicle position, may be transferred to off-board the vehicle. The entire EVAP system OBD pressure bleed-up dataset may be reconstructed at the off-board location and used for future diagnostics, and service.

If it is determined that the $R^2$ value is lower than the threshold $R^2$ valve or the sum of the squared error is higher than the threshold value, it may be inferred that the expected curve profile did not fit the dataset. Therefore, at 312, the OBD data may be also fitted with unexpected curve profiles which may not conform to expected pressure bleed-up data during EVAP system leak tests. It may be inferred that vehicle operating conditions (such as an uphill climb, or a pothole) may have caused fuel sloshing which may have caused errors in the diagnostic test. Specifically, fuel slosh generates additional fuel vapors in the fuel tank that may in turn cause fluctuations in fuel tank pressure, such fluctuations may influence the pressure bleed-up as estimated from outputs of the fuel system pressure sensor. The functions used for fitting the data may include polynomials (of different orders), exponential, and Gaussian functions. In one example, the controller may iteratively increase the order of the function, fit the curve, calculate the $R^2$ value, and compare it to the threshold value until a curve fit with a higher than threshold $R^2$ value is achieved.

At 313, a single function may be used to fit a single curve to the entire EVAP system leak test pressure bleed-up data. However, at 314, the bleed-up data may be divided into a plurality of segments, and a distinct function with a distinct set of parameters may be used to fit a curve to each segment. The $R^2$ valve may be computed for each segment, and individually compared to the threshold $R^2$ valve. An example of curve fitting to an EVAP system leak test pressure bleed-up data is shown in FIG. 4.

At 316, the routine includes determining if the $R^2$ valve of the curve fit(s) is higher than the threshold $R^2$ valve or if the sum of the squared error is lower than a threshold value. During conditions when multiple functions are used to fit curves to distinct parts of the data, the $R^2$ valve and the sum of the squared error values of each curve fit may be compared to the respective threshold values. If it is determined that the $R^2$ valves of one or more of the curve fits are lower than the threshold $R^2$ valve or the sum of the squared errors are higher than the corresponding threshold, at 318, the curve fitting parameters, and the curve fitting function may be updated and the curve fitting procedure may be continued.

At 320, if it is determined that the $R^2$ valves of each of the curve fits are higher than the threshold $R^2$ valve or the sum of the squared errors are lower than the corresponding threshold, it may be inferred that a reliable curve fit has been achieved. The curve fitting parameters, the nature of the curve fit, the start, and end point of the data, along with relevant vehicle operating conditions (such as engine temperature, engine load, vehicle speed, ambient temperature, altitude, and vehicle position) may be transferred to the off-board location where it may be further analyzed. The details of data transfer, and further processing is previously described in FIG. 2 (at 220, 222, and 224).

In this way, in response to the curve fit coefficient for a first set of expected curves being lower than the threshold, one or more another set of curves that are based on expected and/or unexpected profile of the diagnostic data may be iteratively selected, and the one or more another set of curves may be fitted to the one or more segments until the curve fit coefficient for one of the one or more another set of curves is higher than the threshold. Thereafter the curve fit coefficient may be transferred for another set of curves to the off-board location.

FIG. 4 shows an example curve fitting for an evaporative emissions control system diagnostic data. The x-axis denoted time, and the y-axis denoted pressure in the fuel system as measured by a pressure sensor coupled to the fuel tank. The vertical markers t0-t4 identify significant times during soot accumulation and PM sensor regeneration.

Prior to time t0, the plot 401 denotes a drop in fuel system pressure (pressure pull-down phase) as air is drawn out of the fuel system (to the atmosphere) via an evaporative leak check module (ELCM) pump. A crossover valve (COV) coupled to the ELCM may be held at a first position, and the pump may be operated until the lower pressure in the fuel system reached the start-point pressure value denoted by the dot 402. Once the fuel system pressure reaches the desired lower pressure value, at time t0, the fuel system may be isolated by closing the canister vent valve (canister purge valve already in closed position), and shifting the position of the cross over valve to a second position. The pressure bleed-up in the fuel system may be monitored between time t1, and t4, and if the final pressure is lower than a threshold pressure (as denoted by dotted line 415), it may be inferred that the EVAP system is robust and that no leak has been detected.

Following the isolation of the fuel system, a pressure build-up may be monitored during the negative pressure EVAP system leak detection test. Plot 403 shows the pressure bleep-up profile during the test. Between time t0 and t1, the pressure build-up may continue linearly, following an expected trend. However, at time t1, there may be an unexpected change in vehicle operating conditions (such as a maneuver) causing fuel sloshing. During vehicle maneuvers such as sweeping left turns or right turns (e.g., vehicle turns at speeds that are higher than a threshold speed and/or vehicle turns at higher than threshold turn speeds), uphill vehicle travel (e.g., vehicle travel along an incline that is higher than a threshold grade), and travel along a bumpy road (e.g., vehicle travel along a track having a lower than threshold smoothness), fuel may slosh. Still other maneuvers that may cause fuel sloshing include vehicle travel along undulating track surfaces, aggressive braking maneuvers, and vehicle acceleration along any axis. Fuel slosh may be inferred based on vehicle motion, as inferred from a vehicle motion sensor, and/or changes in fuel tank pressure. Specifically, fuel slosh may generate additional fuel vapors in the fuel tank that may in turn cause fluctuations in fuel tank pressure, as determined from the output of a fuel tank pressure sensor. Due to such fluctuations in fuel tank pressure, between time t1, and t3, there may be a spike in the pressure bleed-up profile.

Due to the fluctuations in fuel system pressure, and the consequent spike, the pressure bleed-up profile may not accurately reflect the expected pressure profile for an EVAP system diagnostic test. The pressure may be continued to be monitored until time t4, and the final end-point pressure value at time t4 (shown by dot 416) may be recorded, and compared to the threshold pressure level (line 415). In this example, based on the higher than threshold final fuel system pressure (end-point pressure 416) at the end of the test period, it may be inferred that there is a leak in the EVAP system. However, this result may be erroneous and may have been caused by the fuel sloshing (between time t1, and t3) which caused fluctuations in the fuel system pressure. The pressure data collected between time to, and t1 may be extrapolated (as shown by dotted line 414) to time t4, and it may be inferred that in the absence of fluctuations due to external sources, the final pressure would have reached the pressure level as shown by the expected end-point pressure 417 which is lower than the threshold.

In one example, the entire pressure bleed-up dataset collected between time t0 and time t1 may be fitted with a single function. An expected curve profile (function) and expected parameters may be first used to fit the data. If the expected function and parameters do not provide a reliable fit to the data, other functions, and different sets of parameters may be iteratively tried out. Based on the profile of the data, a Gaussian curve may be selected to fit the entire dataset. The parameters of the Gaussian may be iteratively altered until the coefficient of determination ($R^2$) value of the fit is higher than a threshold value. Dotted line 412 shows the Gaussian fit to the pressure bleed-up profile. Dotted line 412 may be denoted by the function:

$$f(x) = ae^{-\frac{(x-b)^2}{2c^2}} \qquad (2)$$

The constants a, b, and c represent the Gaussian function, and the curve may be reconstructed by using the values of the constants.

In another example, the entire pressure bleed-up dataset collected between time to, and time t1 may be divided into a plurality distinct segments, and a separate function may be used to fit each of the segments. The plot 403 may be divided into four segments, the first segment includes data collected between time t0, and t1, the second segment includes data collected between time t1, and t2, the third segment includes data collected between time t2, and t3, and the fourth segment includes data collected between time t3, and t4. Four distinct second order polynomial functions having different sets of constants may be used to fit the four segments. The parameters of each of the polynomials may be iteratively altered until the $R^2$ values of each of the fits are higher than a threshold value. A first polynomial, as shown by line 404, may be denoted by:

$$y=m_1x+b_1 \qquad (3)$$

A second polynomial, as shown by line 406, may be denoted by:

$$y=m_2x+b_2 \qquad (4)$$

A third polynomial, as shown by line 408, may be denoted by:

$$y=m_3x+b_3 \qquad (5)$$

A fourth polynomial, as shown by line 410, may be denoted by:

$$y=m_4x+b_4 \qquad (6)$$

The constants $m_1$, $b_1$, $m_2$, $b_2$, $m_3$, $b_3$, $m_4$, and $b_4$ represents the second-order polynomial functions, and the entire pressure bleed-up dataset may be reconstructed by using the values of the constants.

Once a reliable fit of the pressure bleed-up profile has been achieved, the curve fitting parameters may be transferred to an off-board location such as one of a remote server, an off-board controller, and a network cloud commutatively coupled to the vehicle via wireless communication. In one example, parameters of a polynomial curve that are transferred include the form of the curve (Gaussian, and second-order polynomial in this example), one or more coefficients (constants) of the function used, and $R^2$ value(s) of the curve fit. Further, a start-point and end-point of the diagnostic dataset, that is pressure corresponding to start-point 402 and end-point 416 and vehicle operating conditions at a time of performing the diagnostic routine including engine temperature, engine load, vehicle speed, ambient temperature, altitude, and vehicle position, may also be transferred to off-board the vehicle.

The entire dataset may be reconstructed at the off-board location, and further analyzed with reference to the vehicle operating conditions. Post data analysis at the off-board location, signal may be received (from the off-board location) at the on-board controller to update the result of the test, and the corresponding engine operating conditions. The stored dataset may also be accessed (from off-board location) by technicians during future vehicle servicing.

In this way, OBD data may be effectively fitted with a function, the parameters of the function may be transferred to an off-board location, and the data may be later reconstructed, and used for analyzing the diagnostics. As such, a similar curve fitting, and data processing method may be employed for other EVAP system tests such as a positive pressure test, and for on-board diagnostics (OBD) of any vehicle component such as the exhaust aftertreatment system, the turbocharger system, the exhaust gas recirculation system etc.

FIG. 5 shows an example operating sequence 500 illustrating an evaporative emissions control (EVAP) system diagnostic routine. The diagnostic routine may be carried out using an evaporative leak check module coupled to the engine EVAP system. The horizontal (x-axis) denotes time and the vertical markers t0-t6 identify significant times during the diagnostic routine.

The first plot, line 502, shows the operation of an ELCM pump. The second plot, line 504, shows a position of the crossover valve (COV) coupled to the ELCM system. The third plot, line 506, shows a variation in EVAP system pressure over time as estimated via a pressure sensor coupled to the fuel system. First dotted line 507 shows a lower pressure threshold that corresponds to a starting point for a pressure bleed-up test after application of a negative pressure to the fuel vapor system. Second dotted line 508 shows an upper pressure threshold that corresponds to a termination point of the pressure bleed-up test. The fourth plot, line 510, represents a flag that may be set responsive to a leak being detected in the EVAP system.

Prior to time t1, the ELCM pump may be inactive as the EVAP system diagnostic test is not being carried out during that time. The COV may be in a first position decoupling communication between the pump and the EVAP system.

Also during this time, the EVAP system may not be fluidically connected to the engine (via a canister purge valve), and to the atmosphere (via a canister vent valve). The EVAP system pressure may be maintained at a higher than upper threshold level.

At time t1, an EVAP system diagnostic test may be initiated. Initiation of the test may take place if a threshold time has elapsed since a last iteration of the diagnostic routine, and the passenger cabin is unoccupied. The test may be carried out periodically and/or based on availability of favorable conditions (such as availability of engine off natural vacuum). In response to the initiation of the test, the COV may be shifted to a second position to couple the EVAP system to the atmosphere via the ELCM pump. The pump may be activated (turned on), and air may be drawn out of the EVAP system to the atmosphere. Between time t1, and t2, as the air is drawn out of the EVAP system, the pressure in the EVAP system may steadily decrease.

At time t2, the EVAP system pressure may decrease to the lower threshold pressure. The negative pressure EVAP system diagnostic test may be initiated using this lower EVAP system pressure. Therefore, at this time, the ELCM pump may be deactivated (turned off), and the COV may be shifted to the first position to decouple the pump from the EVAP system. Also, the canister vent valve may be closed (and canister purge valve maintained in closed position) to isolate the EVAP system. Once the EVAP system has been isolated, the bleed-up profile of the EVAP system pressure may be monitored for a pre-determined duration (time between t2, and t3).

At time, t3, upon elapse of the pre-determined time duration, the final EVAP system pressure may be recorded. The final fuel system pressure may be higher than the upper threshold, and a leak in the EVAP system may be inferred based on the higher than upper threshold EVAP system pressure. In response to the detection of the leak in the EVAP system, a flag may be set indicating the presence of a leak. Also, responsive to the detection of the leak, engine operation may be adjusted. For example, a canister purge schedule may be updated to schedule canister purge operations more frequently, independent of the canister load, such that fuel vapor in the fuel system and/or evaporative emissions system are effectively routed to the engine for combustion.

Also at time t3, a best fitting curve may be fitted to the pressure bleed-up data collected between time t2 and t3. The nature of an expected curve for this data may be retrieved from the controller memory. A coefficient of determination ($R^2$) value may be computed for the fit, and compared to a threshold $R^2$ value. If the expected curve does not provide a higher than threshold fit, one or more other curves (such as polynomials of different orders, exponential curves, Gaussian curves) may be iteratively tried until a curve fit with a higher than threshold $R^2$ value is achieved. Once a reliable curve fit has been achieved, the coefficients of the curve(s) and the $R^2$ value(s) may be transferred to an off-board location. Also, the start and end data points, and vehicle operating conditions during the test, such as temperature, altitude, vehicle speed, vehicle location fuel level, engine load, etc., may be transferred to the off-board location. At the off-board location, the entire dataset may be reconstructed using the curve fitting co-efficients, and further analyzed. The vehicle controller may receive instructions from the off-board location for opportunistically repeating the EVAP system diagnostic test after a threshold period of time and updating EVAP system leak test results and engine operations based on the repeated test. Also, a curve fitting form, and parameters may be received from the off-board location for the next EVAP system diagnostic test.

Between time t3 and t4, the flag indicating a leak in the EVAP system may be maintained, and an updated canister purge routine may be used. At time t4, it may be inferred that the threshold period of time has elapsed, and the conditions are favorable for repeating the EVAP system leak test. Therefore, the COV may be actuated to the second position, and the ELCM pump may be activated, in order to reduce the EVAP system pressure to the lower pressure threshold. At time t5, based on input from the fuel system pressure sensor, it may be inferred that the EVAP system pressure has reduced to the lower threshold pressure, and the negative pressure test may be initiated. In order to initiate the pressure bleed-up test, the EVAP system may be isolated by shifting the COV to the first position, and closing the canister vent valve. Also, the ELCM pump may be deactivated.

Between time t5, and t6, the bleed-up profile of the EVAP system pressure may be monitored and the EVAP system pressure at time t6 may be recorded. As such, the time duration of the second bleed-up test (from time t5, to t6), may be equal to the time duration for the first bleed-up test (from time t2, to t3). At time t6, based on the input from the fuel system pressure sensor it may be inferred that the final pressure at the end of the second bleed-up test may be lower than the upper threshold. Due to the lower than upper threshold EVAP system pressure, it may be inferred that there is no leak present in the EVAP system, and the previous (first bleed-up) test had produced an erroneous result due to external factors such as vehicle maneuvers causing fuel sloshing. In response to the detection that the EVAP system is robust without any leaks, the flag indicating a fuel system leak may be removed, and also engine operations may be updated. As an example, the frequency of the canister purge schedule may be reduced, and the canister may be opportunistically purged based on canister load. In this way, based on signal acquired from the off-board location, the EVAP system diagnostic test may be repeated, and an erroneous indication of an EVAP system leak may be updated.

An example method for a vehicle including an engine, comprises fitting a function to one or more segments of a diagnostic dataset for an engine component on-board the vehicle, and transferring parameters of the function, and not the one or more segments of the dataset, to an off-board location. Any preceding example, additionally or optionally further comprises estimating an initial state of the engine component based on the diagnostic data on-board the vehicle, and updating the initial state based on a signal received from the off-board location, and adjusting engine operation based on the updated state, the signal based on the transferred parameters. Any or all of the preceding examples, additionally or optionally further comprises transferring a form of the function in addition to the parameters of the function, the function is a polynomial curve. In any or all of the preceding examples, additionally or optionally, the parameters of the polynomial curve include one or more coefficients of a polynomial of the polynomial curve, and a coefficient of determination ($R^2$) of the polynomial curve. In any or all of the preceding examples, additionally or optionally, fitting the curve and transferring includes: selecting a first set of curves based on an expected profile of the diagnostic data, the expected profile based on the engine component being diagnosed, fitting the first set of curves to the one or more segments, and in response to a curve fit coefficient for the first set of curves being higher than a threshold, transferring the curve fit coefficient for the first set of curves to the off-board location. In any or all of the preceding examples, additionally or optionally, the curve fitting further includes: in response to the curve fit coefficient for the first set of curves being lower than the threshold, selecting a second set of curves based on the expected profile of the diagnostic data, fitting the second set of curves to the one or more segments, and transferring the curve fit coefficient for the second set of curves to the off-board location. In any or all of the preceding examples, additionally or optionally, the curve fitting further includes: in response to the curve fit coefficient for the first set of curves being lower than the threshold, iteratively selecting one or more another set of curves based on the expected profile of the diagnostic data and fitting the one or more another set of curves to the one or more segments until the curve fit coefficient for one of the one or more another set of curves is higher than the threshold, and then transferring the curve fit coefficient for the another set of curves to the off-board location. In any or all of the preceding examples, additionally or optionally, the engine component includes a fuel system coupled to the engine, and wherein the diagnostic dataset includes a fuel tank pressure profile generated during an evaporative emissions leak test, and adjusting engine operation includes increasing a frequency of purging a fuel system canister to the engine. Any or all of the preceding examples, additionally or optionally further comprises, transferring data corresponding to a start-point and an end-point of the dataset to the off-board location. In any or all of the preceding examples, additionally or optionally, the transferring to the off-board location includes transferring to one of a remote server, an off-board controller, and a network cloud commutatively coupled to the vehicle. Any or all of the preceding examples, additionally or optionally further comprises, selecting the polynomial curve based on a type of diagnostic test, the selecting includes selecting a first polynomial equation for a positive pressure evaporative emissions leak test, and selecting a second polynomial equation for a negative pressure evaporative emissions leak test.

Another example method for a vehicle comprises generating a first dataset by performing a diagnostic routine for a vehicle component, fitting a curve having a higher than threshold fit coefficient to at least a segment of the first dataset, the curve selected based on an expected profile of the first dataset, transferring the curve fit coefficient to a location off-board the vehicle; and learning a diagnostic state of the vehicle component based on the generated first dataset. In the preceding example, additionally or optionally, the learning the diagnostic state of the vehicle component on-board the vehicle is further based on the curve fit coefficient. Any or all of the preceding examples, additionally or optionally further comprises, transferring a start-point and end-point of the first dataset, and vehicle operating conditions at a time of performing the diagnostic routine including engine temperature, engine load, vehicle speed, ambient temperature, altitude, and vehicle position, to off-board the vehicle. Any or all of the preceding examples, additionally or optionally further comprises, receiving, from off-board the vehicle, an updated diagnostic state of the vehicle component, and adjusting, on-board the vehicle, one or more operating parameters of the vehicle based on the updated diagnostic state. In any or all of the preceding examples, additionally or optionally, the updated diagnostic state is based on a reconstructed dataset that is reconstructed off-board the vehicle using the start point, end point, and curve fit coefficient. Any or all of the preceding examples, additionally or optionally, receiving a form of curve fitting function, generating a second dataset by repeating the diagnostic routine for the vehicle component, fitting a curve with the received form of curve fitting function to at least a segment of the second dataset, transferring updated curve fit coefficient to the location off-board the vehicle; and learning an updated diagnostic state of the vehicle component based on the generated second dataset. Any or all of the preceding examples, additionally or optionally further comprises, indicating fuel sloshing in a fuel tank based on the dataset of the diagnostic routine, and further based on the updated diagnostic state received from off-board the vehicle.

In yet another example, a fuel system for a vehicle, comprises a fuel tank, an evaporative emission control system (EVAP) including a fuel vapor canister coupled to the fuel tank via an isolation valve, a canister purge valve (CPV) positioned in a purge line between the fuel vapor canister and an engine intake manifold, a canister vent valve (CVV) positioned in a vent line between the fuel vapor canister and atmosphere, and a pressure sensor coupled to the fuel tank, a wireless communication device communicatively coupling the vehicle to an off-board controller, and an on-board controller, located on-board the vehicle, configured with computer readable instructions stored on non-transitory memory for: performing an EVAP system diagnostic test by applying vacuum to the EVAP system, isolating the EVAP system from the engine and atmosphere by closing each of the vent valve and the purge valve, and monitoring an actual pressure bleed-up profile via the pressure sensor, in response to a higher than threshold rate of pressure bleed-up, indicating degradation of the EVAP system, adjusting a frequency of opening the CPV during engine operation based on the indication, fitting the actual pressure bleed-up profile using a curve profile having a higher than threshold coefficient of determination (R2), the curve profile selected from a set of curve profiles based on an expected pressure bleed-up profile, and uploading each of one or more coefficients of the curve profile, the $R^2$, a start-point and an endpoint of the actual pressure bleed-up profile to the off-board controller. In the preceding example, additionally or optionally, the indicating degradation includes an initial indication, wherein the controller includes further instructions for: based on input received from the off-board controller, updating the initial indication of degradation, and further adjusting the frequency of opening the CPV, based on the received input. In any or all of the preceding examples, additionally or optionally, fitting the actual pressure bleed-up profile includes fitting one or more curves of the set of curve profiles to one of entire dataset or sections of the dataset corresponding to the actual pressure bleed-up profile, wherein the one of curves include a polynomial curve, an exponential curve, and a Gaussian curve.

In this way, by best fitting a polynomial curve to diagnostic data generated on-board the vehicle, and transferring parameters of the curve and other relevant details of the test to an off-board location, it may be possible to facilitate real-time and future analysis of diagnostic data at an off-board location. By utilizing signals received at an on-board controller from the off-board location, the results from an erroneous diagnostic test may be updated, and engine operations may be suitably adjusted. The technical effect of transferring only the parameters of the curve fit, and start and end points of the data to an off-board location is that faster transfer of data to the off-board location may be accomplished using a smaller band-width. Also, due to the transfer of a smaller portion of the data, a smaller amount of memory may be occupied at the off-board location. Overall, by fitting a curve, and transferring a smaller amount of data, the entire OBD dataset may be reproduced and analyzed at an off-board location, thereby increasing the accuracy and reliability of off-board data analysis. By updating diagnostic test results based on data analyzed at an off-board location, vehicle performance is improved.

In another representation, an example method for a system including a vehicle with an on-board controller and an off-board processing system may include, at the on-board controller: fitting a function to one or more segments of a diagnostic dataset for an engine component on-board the vehicle; and transferring parameters of the function, and not the one or more segments of the dataset, to the off-board location, and at the off-board system at a processor reconstructing the one or more segments via the function and the parameters, determining degradation of one or more components on-board the vehicle based on the reconstructed segments, and returning, to the on-board controller, a determined degradation state indicator. The off-board system may further include transferring updated calibration data for the vehicle to the on-board controller based on the transferred parameters and/or the function, the vehicle engine and/or valve control operation adjusted based on the updated calibration data.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle including an engine, comprising:
fitting a function to one or more segments of a diagnostic dataset for an engine component on-board the vehicle, including selecting a first set of curves and fitting the first set of curves to the one or more segments; and
transferring parameters of the function, and not the one or more segments of the dataset, to an off-board location, including in response to a curve fit coefficient for the first set of curves being higher than a threshold, transferring the curve fit coefficient for the first set of curves to the off-board location.

2. The method of claim 1, further comprising estimating an initial state of the engine component based on the diagnostic data on-board the vehicle; and
updating the initial state based on a signal received from the off-board location, and adjusting engine operation based on the updated state, the signal based on the transferred parameters.

3. The method of claim 1, further comprising transferring a form of the function in addition to the parameters of the function, the function is a polynomial curve.

4. The method of claim 3, wherein the parameters of the polynomial curve include one or more coefficients of a polynomial of the polynomial curve, and a coefficient of determination ($R^2$) of the polynomial curve.

5. The method of claim 1, wherein fitting the curve and transferring includes:
selecting the first set of curves based on an expected profile of the diagnostic data, the expected profile based on the engine component being diagnosed.

6. The method of claim 5, wherein the curve fitting further includes:
in response to the curve fit coefficient for the first set of curves being lower than the threshold, selecting a second set of curves based on the expected profile of the diagnostic data;
fitting the second set of curves to the one or more segments; and
transferring the curve fit coefficient for the second set of curves to the off-board location.

7. The method of claim 5, wherein the curve fitting further includes:
in response to the curve fit coefficient for the first set of curves being lower than the threshold,
iteratively selecting one or more another set of curves based on the expected profile of the diagnostic data and fitting the one or more another set of curves to the one or more segments until the curve fit coefficient for one of the one or more another set of curves is higher than the threshold; and
then transferring the curve fit coefficient for another set of curves to the off-board location.

8. The method of claim 1, wherein the engine component includes a fuel system coupled to the engine, and wherein the diagnostic dataset includes a fuel tank pressure profile generated during an evaporative emissions leak test, and adjusting engine operation includes increasing a frequency of purging a fuel system canister to the engine.

9. The method of claim 1, further comprising, transferring data corresponding to a start-point and an end-point of the dataset to the off-board location.

10. The method of claim 1, wherein the transferring to the off-board location includes transferring to one of a remote server, an off-board controller, and a network cloud commutatively coupled to the vehicle.

11. The method of claim 8, further comprising selecting the polynomial curve based on a type of diagnostic test, the selecting includes selecting a first polynomial equation for a positive pressure evaporative emissions leak test, and selecting a second polynomial equation for a negative pressure evaporative emissions leak test.

12. A method for a vehicle, comprising:
generating a first dataset by performing a diagnostic routine for a vehicle component;
fitting a curve having a higher than threshold fit coefficient to a segment of the first dataset, the curve selected based on an expected profile of the first dataset;
transferring the curve fit coefficient to a location off-board the vehicle; and
learning a diagnostic state of the vehicle component based on the generated first dataset.

13. The method of claim 12, wherein the learning the diagnostic state of the vehicle component on-board the vehicle is further based on the curve fit coefficient.

14. The method of claim 12, further comprising, transferring a start-point and end-point of the first dataset, and vehicle operating conditions at a time of performing the diagnostic routine including engine temperature, engine load, vehicle speed, ambient temperature, altitude, and vehicle position, to off-board the vehicle.

15. The method of claim 12, further comprising,
receiving, from off-board the vehicle, an updated diagnostic state of the vehicle component; and
adjusting, on-board the vehicle, one or more operating parameters of the vehicle based on the updated diagnostic state.

16. The method of claim 15, wherein the updated diagnostic state is based on a reconstructed dataset that is reconstructed off-board the vehicle using the start point, end point, and curve fit coefficient.

17. The method of claim 12, further comprising, receiving a form of curve fitting function, generating a second dataset by repeating the diagnostic routine for the vehicle component, fitting a curve with the received form of curve fitting function to at least a segment of the second dataset, transferring updated curve fit coefficient to the location off-board the vehicle; and learning an updated diagnostic state of the vehicle component based on the generated second dataset.

18. A fuel system for a vehicle, comprising:
a fuel tank;
an evaporative emission control system (EVAP) including a fuel vapor canister coupled to the fuel tank via an isolation valve, a canister purge valve (CPV) positioned in a purge line between the fuel vapor canister and an engine intake manifold, a canister vent valve (CVV) positioned in a vent line between the fuel vapor canister and atmosphere, and a pressure sensor coupled to the fuel tank;
a wireless communication device communicatively coupling the vehicle to an off-board controller; and
an on-board controller, located on-board the vehicle, configured with computer readable instructions stored on non-transitory memory for:
performing an EVAP system diagnostic test by applying vacuum to the EVAP system, isolating the EVAP system from the engine and atmosphere by closing each of the vent valve and the purge valve, and monitoring an actual pressure bleed-up profile via the pressure sensor;
in response to a higher than threshold rate of pressure bleed-up,
indicating degradation of the EVAP system;
adjusting a frequency of opening the CPV during engine operation based on the indication;
fitting the actual pressure bleed-up profile using a curve profile having a higher than threshold coefficient of determination ($R^2$), the curve profile selected from a set of curve profiles based on an expected pressure bleed-up profile; and
uploading each of one or more coefficients of the curve profile, the R2, a start-point and an endpoint of the actual pressure bleed-up profile to the off-board controller.

19. The system of claim 18, wherein the indicating degradation includes an initial indication, wherein the controller includes further instructions for:
based on input received from the off-board controller, updating the initial indication of degradation; and
further adjusting the frequency of opening the CPV, based on the received input.

20. The system of claim 18, wherein fitting the actual pressure bleed-up profile includes fitting one or more curves of the set of curve profiles to one of entire dataset or sections of the dataset corresponding to the actual pressure bleed-up profile, wherein the one of curves include a polynomial curve, an exponential curve, and a Gaussian curve.

* * * * *